United States Patent [19]

Rossler, Jr. et al.

[11] 4,318,073

[45] Mar. 2, 1982

[54] TEMPERATURE SENSOR

[75] Inventors: Frederick W. Rossler, Jr., New Port Richey; Steven Feldman, Seminole, both of Fla.

[73] Assignee: AMP Incorporated, Harrisburg, Pa.

[21] Appl. No.: 182,567

[22] Filed: Aug. 29, 1980

[51] Int. Cl.³ .............................................. H01C 7/04
[52] U.S. Cl. ....................................... 338/28; 29/612; 338/22 R; 338/30; 338/271
[58] Field of Search ................... 338/28, 30, 271, 229, 338/25, 22 R, 22 SD; 73/339, 342, 346, 347, 362 AR; 29/612, 610, 613; 324/149, 65 P, 65 R

[56] References Cited

U.S. PATENT DOCUMENTS

| 2,484,585 | 10/1949 | Quinn | 73/362 AR |
|---|---|---|---|
| 2,753,714 | 7/1956 | Perkins et al. | 73/362 AR |
| 2,888,655 | 5/1959 | Lawler | 338/28 |
| 3,754,201 | 8/1973 | Adams | 338/28 |
| 3,832,668 | 8/1974 | Berman | 338/30 X |
| 3,890,588 | 6/1975 | Kanaya et al. | 338/28 |
| 4,143,347 | 3/1979 | Ichida | 338/28 |

FOREIGN PATENT DOCUMENTS 488838  7/1938  United Kingdom ................. 73/347

Primary Examiner—C. L. Albritton
Attorney, Agent, or Firm—Faller F. Brice

[57] ABSTRACT

Temperature sensor in plug form comprises a plastic body member having a bore with a metallic sensing member in one end, a thermistor in the bore, and a contact member with a spring portion in the bore and a contact portion extending through a slot in the body member from the bore to the other end of the body. Contact portion has electrical terminal for wire attachment and spring portion maintains contact with thermistor. Sensing member has retaining arms which extend into grooves in threaded cylindrical surface of body which are threaded as body is screwed into place in an engine block.

6 Claims, 5 Drawing Figures

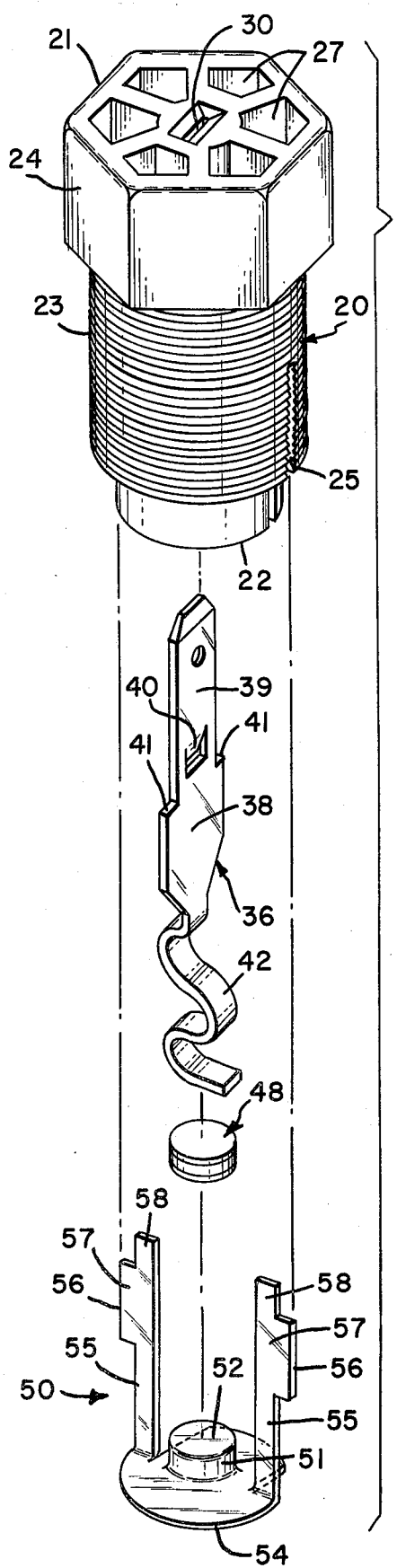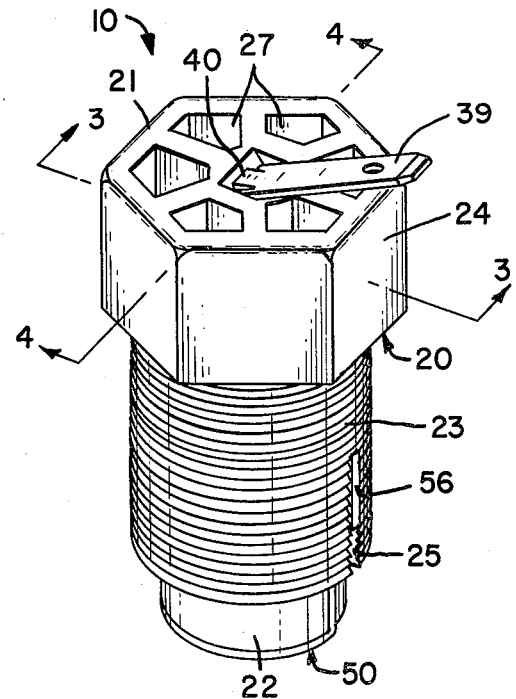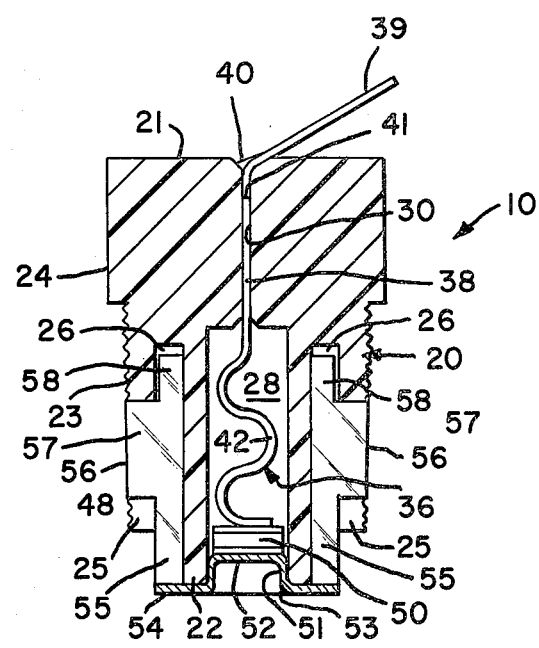

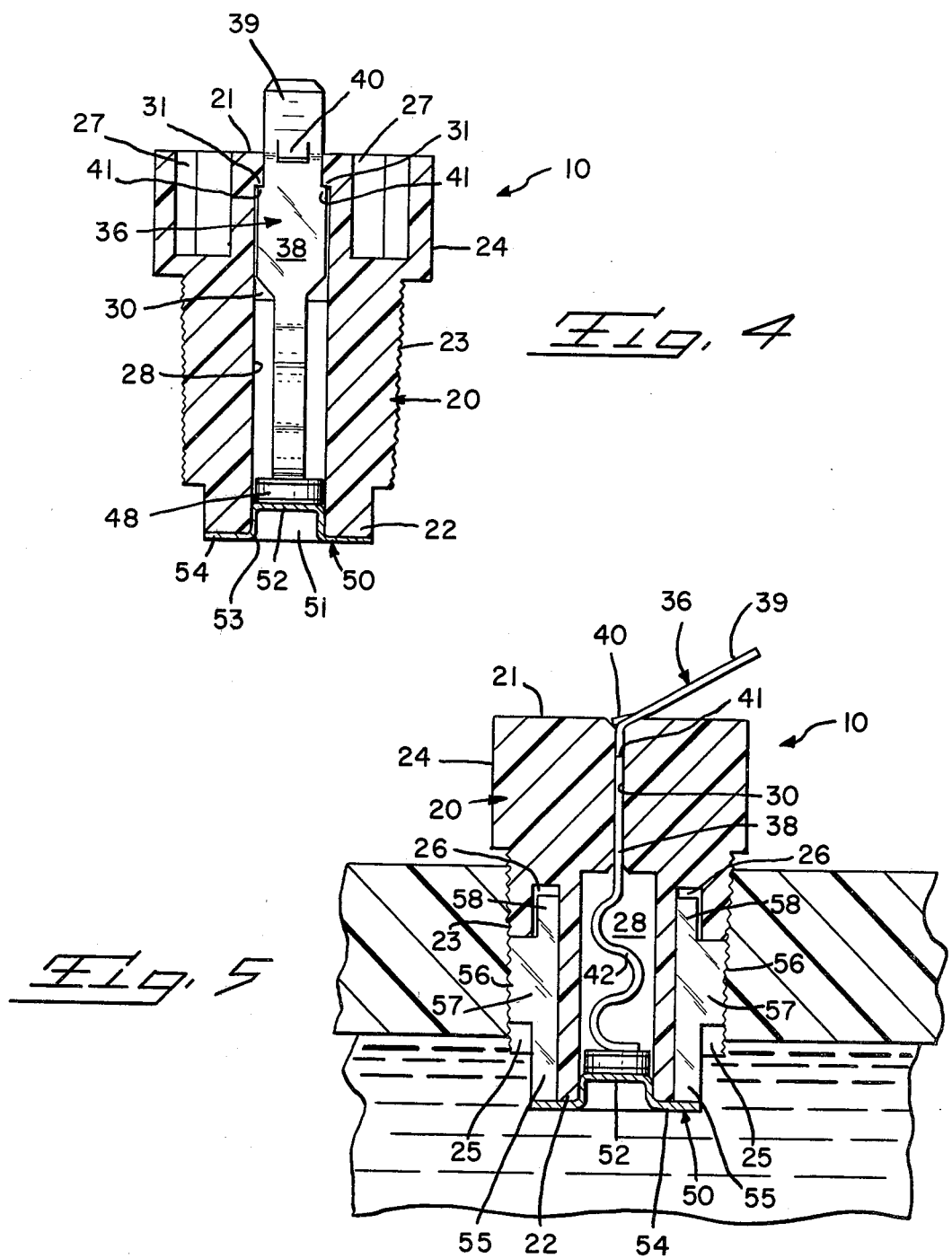

TEMPERATURE SENSOR

BACKGROUND OF THE INVENTION

The present invention relates to temperature sensors, and particularly to a sensor employing a thermistor which screws into an automotive engine block.

Automotive temperature sensors are generally in the form of a ⅜ inch taper threaded plug with the sensing end screwed into the engine block so it is in contact with the coolant in the case of a liquid cooled engine. One type of sensor employs a bulb filled with liquid and tubing connected to a gauge so that any temperature increase causes the liquid to expand which is translated into a continuously variable gauge reading. These are quite effective but expensive to manufacture and generally must be replaced as a system. Sensors employing bimetallic strips were developed where non-uniform expansion of the strip makes an electrical contact which activates an indicator light, but this sacrifices a continuous reading. The commonest type for a continuously reading gauge is that employing a thermistor. A thermistor is a solid state semi-conducting device whose electrical resistance varies with temperature. Common thermistors for automotive use have resistances on the order of 300 to 1000 ohms at 72 degrees F., the resistance decreasing as temperature increases to permit a current increase for a constant voltage drop, typically 12 volts. The thermistor is installed in the plug so that it is thermally and electrically grounded at the temperature sensing end and in contact with a conductor encased in the plug at the opposite or signal end, where a wire is attached and connected to a gauge where the amount of current passing through the wire translates into a continuously variable gauge reading. The plug is generally machined from brass and the conductor must therefore be insulated from the plug through the use of a sleeve and other fittings. A separate spring is utilized to maintain resilient contact with the thermistor. The prior art plug is provided with a bore in the signal end where the components are inserted and retaining means are placed while the sensing end is solid brass.

SUMMARY OF THE INVENTION

The present invention utilizes a thermally and electrically insulative plug body such as molded plastic and is assembled by inserting components in a bore in the sensing end of the plug. A stamped and formed metal contact member which combines a flat terminal member with a wave shaped spring is inserted into the bore terminal end first so that the terminal fits through a slot at the bottom of the bore and protrudes from the signal end of the plug. A thermistor is placed in the bore against the spring end of the contact member and a stamped and formed sensing member is press fit into the bore to retain the thermistor and seal the bore. Flat metal arms formed on the sensing member fit into grooves in the threaded surface of the plug and have contact edges contiguous with the cylindrical surface so that screwing the plug into an engine block will cause threads to be cut in the arms which ensures retention of the sensing member in the plug.

The temperature sensor of the present invention is far more economical to manufacture than functionally similar plugs of the prior art, since molded plastic is used in lieu of machined metal for the plug body and far fewer components are involved.

BRIEF DESCRIPTION OF THE DRAWINGS

FIG. 1 is a perspective of an assembled sensor.

FIG. 2 is an exploded perspective of a sensor prior to assembly.

FIG. 3 is a cross section of the sensor detailing the contact member and retaining arms of the sensing member.

FIG. 4 is a cross section detailing the shoulders in the plug and on the contact member.

FIG. 5 is a cross section similar to FIG. 3 showing the sensor as threaded into a liquid cooled engine block.

DETAILED DESCRIPTION OF THE PREFERRED EMBODIMENT

The temperature sensor 10 of the preferred embodiment, FIG. 1, comprises a body member or plug 20 having a signal end 21 and a sensing end 22. A threaded cylindrical surface 23 lies between the ends 21, 22 and a hex surface 24 for application of a wrench is molded at the signal end 21. A sensing member 50 is fit in the sensing end 22 which is connected to blade edge 56 in groove 25 for grounding purposes. A spade terminal 39 protrudes from the signal end 21 of the sensor 10.

FIG. 2 illustrates the components of the sensor prior to assembly. The body member or plug 20 is molded in heat resistant plastic such as polysulfone and has recesses 27 in the signal end 22 which reduce shrinkage problems inherent in the curing of a solid piece of plastic. A slot 30 extends perpendicularly inward from the signal end 21 and is located centrally of the recesses 27 which are surrounded by hex surface 24. The threaded cylindrical surface 23 has standard ⅜ inch taper pipe thread thereon and is thus tapered slightly toward the sensing end to provide an interference fit as this is threaded into a threaded bore in the wall of an engine block.

A contact member 36 is stamped from conductive metal and formed with a resilient wave-shaped spring portion 42 and a contact portion 38 from which a spade terminal 39 extends opposite the spring member 42. A pair of shoulders 41 are stamped from the edges of the contact portion and a lance 40 is stamped thru the contact portion at the base of the spade terminal 39.

The thermistor 48 is pill shaped and is available in several resistance ranges as previously described. Thus it is possible for the sensor of the instant invention to replace those supplied as original equipment, since the temperature gauges from different manufacturers are calibrated for a thermistor with certain properties.

Sensing member 50, FIG. 2, is also stamped and formed in metal. Good ductility is necessary to form cylinder 51 which has a closed end 52 and an open end 53 opposite. (Visible in FIG. 3). The open end is surrounded by a brim 54 which has a pair of parallel retaining arms 55 extending perpendicularly thereto on opposite sides of cylinder 51. The arms 55 have blade sections 57 thereon which are somewhat wider than the rest of the arms. The blade sections 57 each have a contact edge 56 on the side opposite the cylinder. The arms have tips 58 at their extremities which are also the width of the arm on the brim side of the blade section 57.

FIGS. 3 and 4 are cross sections of an assembled sensor 10 which show the internal features of the body member 20. A passage formed axially through the body has a bore portion or bore 28 which is cylindrical in cross section extending inwardly from the sensing end of the body 20 and a retention portion or slot 30 which communicates between the bore portion 28 and the signal end 21. The slot 30 has shoulders 31 therein which are profiled so that the shoulders 41 on the contact member 31 will abut (FIG. 4). The body member 10 has grooves 25 in the threaded cylindrical surface 23 which extend from the sensing end 22 toward the opposite end and are profiled to receive the retaining arms 55 so that contact edges 56 are contiguous with threaded cylindrical surface 23 (FIG. 3). Note well that the grooves do not communicate with the bore 28. The grooves terminate in retention recesses 29 which receive the tops 58 of the retaining arms 55.

The temperature sensor 10 is assembled by first inserting the contact member 36 into the bore portion 28 of the passage in plug 20 until the spade terminal 39 passes through slot 30 and shoulders 41 on the contact portion 38 abut shoulders 31 in the slot. The spade terminal 39 may then be bent over so that lance 40 latches over signal end 21 as shown in FIG. 3. The thermistor 48 is then placed in the bore 28 against spring portion 42 of the contact member 36 and the cylinder 51 of sensing member 50 is pushed into the bore 28 until brim 54 abuts the sensing end of the plug 20. The cylinder and bore are designed for a close interference fit so that the internal components of the sensor will be sealed from intrusion of coolant. Note that retaining arms 55 are aligned with grooves 25 as the spade terminal 39 is aligned with slot 30.

Referring to FIG. 5, the assembled sensor 10 of FIG. 1 is placed in service by screwing it into a threaded bore in the wall 60 of an engine block. The block is then filled with coolant 62 so that the sensing member 50 is immersed in the coolant 62. While the sensor 10 is threaded in, the blade edges 56 of the retaining arms 55 are cut with threads by the threads in the bore in the block, which acts as a die. This is not difficult since an engine block is generally cast iron which is harder than the retaining arms 55 which are in a formable metal such as brass. The threads thus formed on the contact edges serve to positively retain the sensing member in the bore 28 in plug 20. A standard clip type termination is mated to the spade terminal 39 and permits passage of current through the contact member 36, the thermistor 48, and ultimately to ground through the retaining arms 55. The sensing member 50 thus forms the dual function of transferring heat from the coolant 62 to the thermistor and allowing electric current to pass. The amount of current passing is a function of heat and may be translated to a gauge reading in view of the driver of a vehicle.

The foregoing description is exemplary and is not intended to be restrictive of the scope of the claims which follow.

What is claimed is:

1. A temperature sensor of the type having a sensing end which contacts the medium whose temperature is to be measured and a signal end where an electrical conductor is attached comprises:
   a thermally and electrically insulative body member having a sensing end and a signal end and having a passage therethrough between said ends,
   a thermally and electrically conductive sensing member in said passage at said sensing end, said sensing member having retaining means by which it is retained in the passage and grounding means by which a signal current passes to ground,
   a thermistor in said passage against said sensing member,
   an electrically conductive contact member which is continuous in said passage between said thermistor and said signal sending end, said contact member having a spring portion and a contact portion, said spring portion lying between said thermistor and said contact portion, said passage in said body member being profiled with a bore portion toward said sensing end which loosely accommodates said spring portion and a retention portion toward said signal end which closely accommodates said contact portion, said passage having a shoulder therein which restricts the size of said passage between said bore portion and the signal sending end of the body, said contact portion of said contact member having a should thereon which bears against said shoulder in said passage, whereby said spring portion maintains resilient contact with said thermistor.

2. A temperature sensor as in claim 1 wherein said contact member is stamped and formed from conductive metal, said spring portion being wave-shaped, said contact portion being flat where it passes through said retention portion.

3. A temperature sensor as in claim 2 wherein said contact portion has a flat spade portion which protrudes from said signal end and a lance stamped in said spade portion which bears against said signal end of said sensor.

4. A temperature sensor as in claim 1 wherein said sensing member is stamped and formed from conductive metal in the shape of a cylinder with a closed end and an open end with a flat annular brim surrounding said open end, said passage in said body member being profiled to closely receive said cylinder, said brim abutting said sensing end.

5. A temperature sensor as in claim 4 wherein
   said body member is a plug having a generally cylindrical surface with threads thereon between said ends, whereby said plug may be threaded into a threaded bore in a mounting surface, said threaded bore communicating with the medium whose temperature is sensed,
   said sensing member has a pair of parallel arms which extend perpendicularly of said brim in the direction of the signal end of the body member, said arms being spaced from said sensing member cylinder and extending beyond said closed end of said cylinder, said cylindrical surface of said plug body having a pair of grooves therein which closely accommodate said arms on opposite sides of said passage, said arms having contact edges which are generally flush with the cylindrical surface, whereby threads are formed in said contact edges as said plug is threaded into said bore on said mounting surface and said arms retain said sensing member cylinder in the passage in the sensing end of the body member.

6. A method of assembling a temperature sensor which comprises the steps of:
   providing a thermally and electrically insulative body member having a signal end and a sensing end, said sensing end having a bore therein which communicates with a slot which communicates with said signal end,
   providing a contact member stamped and formed from conductive metal, said contact member having a flat contact end and a spring end, and inserting said flat contact end into said bore and through said bore against said slot until said spring end lies in said bore and said contact end lies in said slot,
placing a thermistor in said spring end of said bore against said contact member,
placing a sensing member stamped and formed from conductive metal in said bore against said thermistor, said sensing member comprising a cylinder which fits closely in said bore, a brim which abuts the sensing end of the body member, and retaining means for holding said cylinder in said bore.

* * * * *